June 30, 1959 A. W. VIBBER Re. 24,662

METHOD OF AND APPARATUS FOR PLYING STRANDS

Original Filed March 12, 1953 3 Sheets-Sheet 1

INVENTOR.

Alfred W. Vibber

METHOD OF AND APPARATUS FOR PLYING STRANDS

Original Filed March 12, 1953 3 Sheets-Sheet 2

INVENTOR.

Alfred W. Vibber

METHOD OF AND APPARATUS FOR PLYING STRANDS
Original Filed March 12, 1953 3 Sheets-Sheet 3
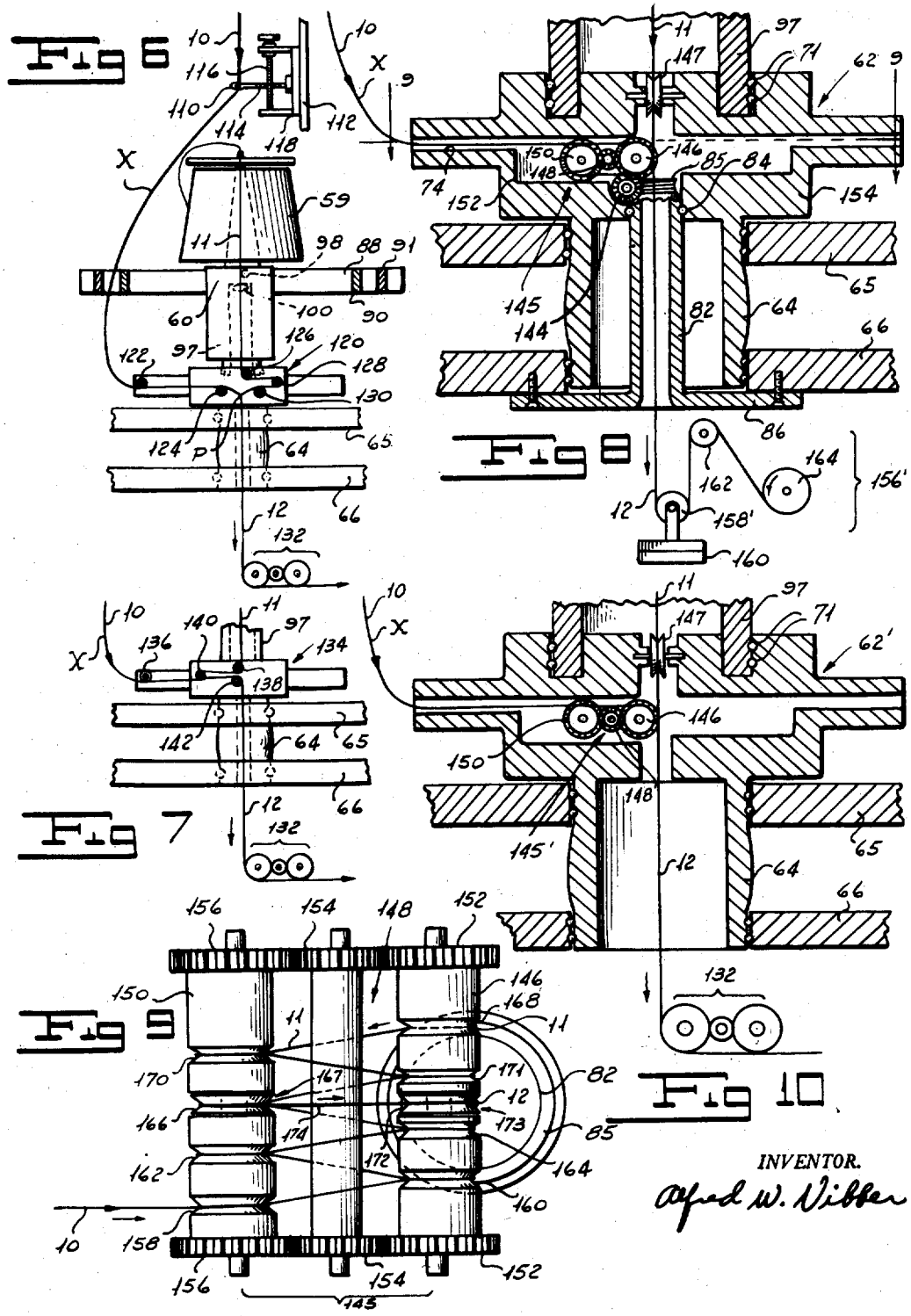
INVENTOR.
Alfred W. Vibber United States Patent Office Re. 24,662
Reissued June 30, 1959

24,662

METHOD OF AND APPARATUS FOR PLYING STRANDS

Alfred W. Vibber, Ridgewood, N.J.

Original No. 2,732,680, dated January 31, 1956, Serial No. 341,865, March 12, 1953. Application for reissue November 19, 1957, Serial No. 698,891

34 Claims. (Cl. 57—58.3)

Matter enclosed in heavy brackets [ ] appears in the original patent but forms no part of this reissue specification; matter printed in italics indicates the additions made by reissue.

This invention relates to a method of and an apparatus for plying strands together to form cords. More particularly, the invention relates to the control of the speeds of feeding of the component strands to the point of plying them together, to the control of the attiude of the strands at such point with respect to each other and to the plied cord, and to the control of the tension condition of the strands as they approach the plying point, thereby producing a cord having optimum desired characteristics. The invention further relates to a plying device for carrying out the above method which will operate for long periods free from operator attention.

This application is a continuation-in-part of application Serial No. 333,242, filed January 26, 1953, *now reissued as Patent Re. 24,483* bearing the same title. As does the said prior application, this application relates to a system such as that shown in the patent to Clarkson, No. 2,503,242. The present invention provides an apparatus and a method of plying two strands together to form a cord in generally the same manner as in the above Clarkson patent and as in my prior application.

The drawings depict several embodiments of the method and apparatus of the invention. In all such embodiments a two-ply cord is formed by creating and maintaining a first false twisting loop in a first strand leading from a source of supply such as a let-off package, by creating and maintaining a second false twisting loop in a second strand leading from a second let-off package, the axes of the two loops coinciding, rotating the first loop about the second source of supply, and by leading the two strands from their loops generally radially inwardly into contact with each other at at least the axis of rotation of the loop to ply the strands together. In all embodiments of the invention the attitude of the strands with respect to each other and with respect to the plied cord is controlled. In certain embodiments of the invention the strands meet for the first time on the axis of the loop creating flyer and approach such axis and each other symmertically. In other embodiments the strands are combined in parallel relationship prior to reaching the axis of the flyer where they are plied together.

In accordance with the broader aspects of the invention, the strand conducting or feeding means in the flyer may be either idle or driven. When two strand feeding means are incorporated in the flyer, they may be placed opposite each other symmetrically with respect to the axis of the flyer. When such two strand feeding means are incorporated in the flyer, they may be driven in synchronization with each other, if desired, in a simple, positive manner. In other embodiments of the invention there may be only one feeding means in the flyer, driven or idle if desired, the two strands entering such feeding means, usually at different points therein, and progressing therethrough, being combined therein in paralell relationship before emerging into the twisting zone on the axis of the flyer.

When the attitude of the strands with respect to each other and with respect to the plied cord is controlled in accordance with one embodiment of the idle, strand feeding and attitude controlling, means of the present invention, the pull imposed upon the plied cord by the take-up means tends to even out the pull imposed on the two stands prior to their being twisted together, so that each sustains substantially one-half the pull of the take-up means. With such embodiment the plied cord will have substantially the same length of each strand therein, even though the feeding means below the package or source of each strand is permissive rather than positive in character.

The invention has among its objects the provision of an improved method of and an apparatus for plying together a plurality of strands to form a cord.

The invention has as a further object the provision of a method of and an apparatus for plying together strands wherein the speeds of feeding of the strands immediately adjacent the point of plying are positively synchronized by feeding means incorporated in the flyer and acting upon the respective strands.

A further object of the invention lies in the provision, in a cord-forming system wherein the strands are given no additional twist about their own axes but are merely plied together, of apparatus in which both strands are formed into false twisting loops, one such loop rotating about the source of the strand in the other loop, the two strands being led from their loops generally radially inwardly into contact with each other at at least the axis of rotation of the loops to ply them together. In certain embodiments of the invention the strands first meet at such axis. In other embodiments the strands are brought into parallel side-by-side relationship prior to their reaching the axis of the loops.

Yet another object of the invention resides in the provision, in the cord-forming system set out above, of positive feeding means for the two strands being plied such feeding means being symmetrically located in the flyer of the twisting spindle, the two feeding means bringing each of the strands to the plying point at substantially the same angle with respect to the axis of the plied strand.

A still further object of the invention resides in the provision of an apparatus for and a method of plying together strands wherein each of the strands is treated in substantially the same manner, including its subjection to tension and its formation into a loop at the feeding means, whereby the resulting plied strand has its components in substantially the same condition and substantially symmetrically placed in the cord.

The above and further objects of the invention will be more readily apparent upon consideration of the drawings accompanying the specification, in which:

Fig. 6 is a fragmentary, somewhat diagrammatic view in vertical axial section of a first modified system and flyer in accordance with the invention, the strand guiding means in the flyer being idle;

Fig. 7 is a fragmentary, somewhat diagrammatic view in vertical axial section of a second modified system and flyer in accordance with the invention, the strand guiding means in the flyer being idle;

Fig. 8 is a fragmentary, somewhat diagrammatic view in vertical axial section of a third modified system and flyer in accordance with the invention, the single strand feeding means in the flyer engaging both strands and being driven;

Fig. 9 is a view in plan of the strand feeding capstans in the feeding means in the flyer of Fig. 8, the view being taken generally along the line 9—9 of Fig. 8; and Fig. 10 is a view similar to Fig. 8 of a fourth modified system and flyer in accordance with the invention, the single strand feeding means in the flyer positively engaging both strands but being undriven except by the strands.

Figure 1:
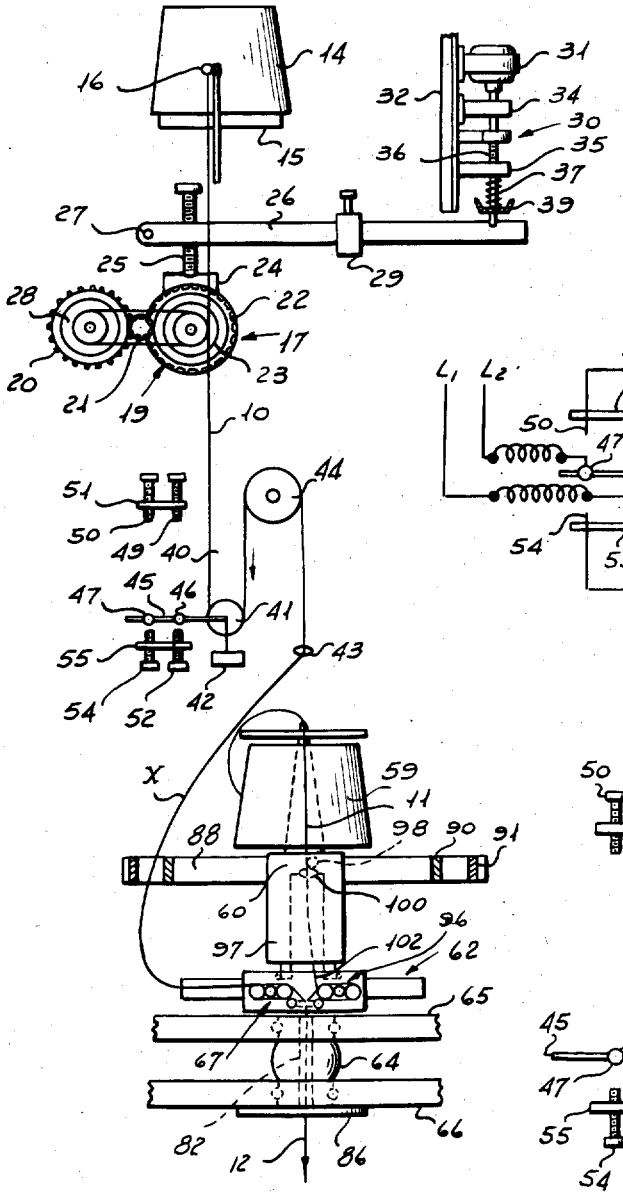
Fig. 1 is a somewhat diagrammatic over-all view in side elevation of the complete system of a first embodiment of the invention.

In the system shown in Fig. 1 two oppositely disposed positively driven strand feeding means are incorporated in the flyer. In such system the first strand, designated 10, proceeds from the first let-off package 14 downwardly through tension control apparatus, to be described, into the balloon x created by the flyer 62. The strand 10 is drawn in through the flyer by the first feeding mechanism 67 therein, to be described, and meets the second strand 11 fed from the second let-off package 59 and positively fed by the second feeding means 96 in the flyer at the point P on the axis of the flyer, the two strands being plied together so as to emerge as the plied strands or cord 12. The cord 12 is taken up by a conventional take-up mechanism. Preferably one such as shown in Clarkson Patent No. 2,503,242, withdrawing the cord under constant tension, is employed.

Taking up now the instrumentalities which operate upon the strand 10 in succession, the first let-off package 14 is preferably rotatably mounted upon the support 15 so as to present strand 10 opposite the feed-off eye 16. Strand 10 proceeds downwardly from the eye into the strand feeding capstan system generally designated 17. Means 17 is made up of a first multi-grooved capstan 23 and a second multi-grooved capstan 28 spaced therefrom, the two capstans being positively geared together, so as to rotate at the same speed and in the same direction, by means of the gear 19 on capstan 23, the gear 20 on capstan 28, and the intermediate idler gear 21 meshing with gears 23 and 20, all of such mechanism being carried on fixed framework (not shown). A brake drum 22 is provided on capstan 23 so as variably to retard the two capstans 23 and 28. A brake shoe 24 is thrust against the brake drum 22 by means of the thrust pin 25 mounted on the brake lever 26, such lever being pivotally mounted on a fixed part of the machine (not shown) by the pivot pin 27. The primary braking effort is contributed by the collar shaped weight 29 slidable along lever 26 and positionable thereon by the set screw on top of the weight.

The brake means is variably energized by means of control mechanism, to be described, through the medium of the brake applying device 30. Device 30, mounted upon the frame part 32, includes the small low voltage direct current motor 31 which drives a worm 36 through the speed reducing mechanism 34. Mounted on the worm is the nut 35 which is non-rotatably guided so as to rise and fall as the motor is energized selectively to rotate in reverse directions. A compression coil spring 37 is disposed about the worm 36 below the nut 35, the lower end of such spring fitting within the spring seat 39 which is supported in a seat on the top of the outer end of the lever 26. The mechanism 30 is more fully described and shown in my application Serial No. 274,401, *now Patent No. 2,728,185*.

In Fig. 1 the balloon x in the strand 10 is under the control of the mechanism which is the subject of the embodiment shown in Figs. 1–4, inclusive, of my application Serial No. 315,871. It is to be understood, however, that the variable speed mechanism for feeding the strand 10 into the balloon x may, if desired, be controlled by other devices for measuring the ballon diameter, the length of material in the ballon, or the tension in the material above the eye of the ballon which are the subjects of my prior pending applications including application Serial No. 238,215, *now Patent No. 2,729,932*.

The mechanism shown forms a loop 40 in the strand 10 immediately below the capstan 23 by means of the freely vertically travelling pulley 41 which is pulled downwardly by the weight 42, such weight being selectively adjustable as by the addition or subtraction of smaller weights (not shown) thereto or therefrom, respectively. The strand 10 rises from the pulley 41 over the fixed guide pulley 44, from which it travels downwardly through the eye 43 into the balloon x. It will be apparent that the tension to which the material 10 in loop 40 is subjected by the combined weights of the pulley 41 and the weight 42 is transmitted directly to the material in the balloon x. With a proper choice of the value of weight 42 the balloon x will be stable under fixed conditions of flyer speeds, yarn characteristics, etc., since the balloon x, thus subjected to a constant suitable back tension, tends to seek and remain at a given diameter.

Figure 2:
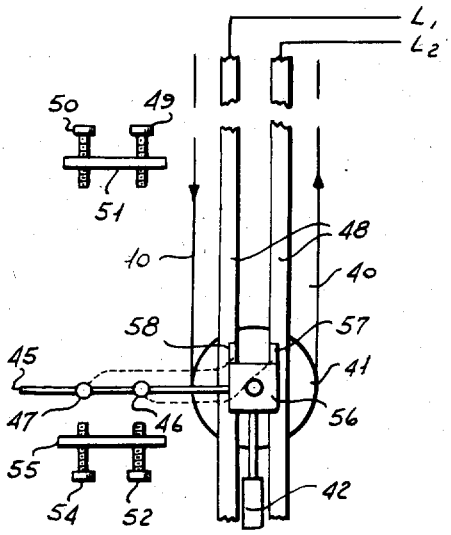
Fig. 2 is a fragmentary view in side elevation of details of the loop forming mechanism forming a part of the means for controlling the rate of feeding of the first strand into the balloon.

Connected to the pulley 41 is the horizontally extending switch arm 45, made of electrically insulating material, which travels therewith between its lower position, in which it engages the bottom contactor 55, to the top position, at which it cooperates with the top contactor 51, both such contactors being mounted on fixed portions of the frame of the machine (not shown). The guide pulley 41 is mounted on opposite ends of its shaft in bearing chocks, of which one is shown at 56 in Fig. 2, such chocks travelling in guide ways provided between two sets of two spaced parallel guide members 48, two of which are shown in Fig. 2. The weight 42 is of such shape as to slide freely in the space provided between such guide members 48. Preferably at least two of the members 48 are insulated from the machine frame and from each other so as to serve as bus bars, one side, $L_1$, of a low tension direct current source being connected to one of such members 48 and the other side, $L_2$, being connected to the other of such members. Connection between the contacts 46 and 47, mounted upon the insulating switch arm 45, is effected through lead wires, shown in dotted lines in Fig. 2, from such contacts to brush members 57 and 58 making connection with their respective members 48.

The contactor 51, which bears separate independently adjustable contacts 49 and 50 insulated from each other, and the contactor 55, which carries similar contacts 52 and 54, together with the switch arm 45 and the contacts 46 and 47, form parts of a reversing and controlling switch for the motor 31 of the brake means 30 above described. The motor 31 is preferably of the type energized by a low potential direct current source, the field 73 being the stator and the rotor 75 being of the fixed high permeability magnet type made, for example, of Alnico. Such motor requires low current feed, thereby minimizing contact difficulties at the reversing switch. Furthermore, because of the permanent magnet rotor, the problem of reversing the motor is a simple one. Because by far the greater part of the necessary retarding torque is contributed by the weight 29, the motor 31 may be of the very small fractional horsepower type, and the spring 37 may be comparatively weak.

Figure 3:
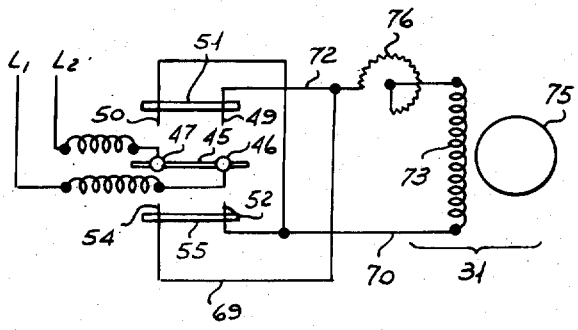
Fig. 3 is a wiring diagram for the motor controlling the speed of feeding of the first strand into the balloon.

The motor 31 is connected to the current source $L_1$, $L_2$ in the manner shown in Fig. 3. The circuit to the motor is such that when the switch arm 45 rises, with the shortening of the loop 40, so that the contacts 46 and 47, respectively, touch contacts 49 and 50, the field 73 of the motor 31 is energized through the thus described contacts and the wires 72 and 71, 70 in such direction as to drive the motor to impel the nut 35 upwardly. The speed at which the motor rotates is adjustable through the manually adjustable rheostat 76 in the motor circuit. The amount of speed reduction afforded by means 34, and the speed with which the motor 31 is run are so chosen that when switch arm 45 cooperates with contactor 51 the motor 31 will have run sufficiently far, before the contact is broken by descent of pulley 41, for the material 10 to run past the capstan 23 at a speed slightly in excess of the speed with which it is taken up at the feeding means 67 in the flyer 62. Such change of speed of material 10 at the feeding means 17 is relatively small; thus the speed at which the pulley 41 descends is relatively slow, thereby avoiding the imposition of mechanical shocks or material unbalances in the system due to marked acceleration or deceleration of masses.

When the pulley 41 has descended sufficiently for the contacts 46 and 47 on arm 45 to touch contacts 52 and 54, respectively, the motor 31 will again be started, this time in the reverse direction. The motor will, of course, remain rotating until the arm 45 is raised by the shortening of loop 40 to break the circuit through the contacts. During the time that the motor 31 remains running, with the arm 45 in its lower position, the nut 35 will have been lowered sufficiently by the motor to apply the brake shoe 24 more forcibly to the brake drum 22. The material 10 will thus be fed more slowly past the capstan 23 so that the loop 40 will begin to shorten and pulley 41 will begin slowly to rise. Thereupon the contacts on switch arm 45 will move away from the contacts on means 55, thereby shutting off the motor. The loop 40 therefore will now continually shorten, since the material at this time will be running more slowly past the capstan 23 than it will be drawn in from balloon x by the feeding means 67. Such process of alternately first paying the material into the loop at a rate slower than it is withdrawn therefrom by the feeding means and then faster than such rate withdrawal from the balloon continues while the machine is in operation.

The above described manner of operation of the apparatus is that which will usually be carried out by it upon normal settings and adjustment of the parts. The apparatus will, however, continue to function to impose a constant tension on the balloon x by maintaining a variable supply of material 10 under constant tension and in tension-transmitting communication with the balloon even if occasionally the pulley 41 should not reach an end (first) point of its travel before again approaching the other (second) end point of its travel. In such case the switch arm 45 upon reaching the contactor at the second end point of travel will cooperate with the contactor at such point to cause the motor 31 to run so that the brake means 30 is adjusted to restore the system to a condition in which the pulley 41 once again has its full travel. In other words, the described pulley, switch arm, and contactors will function automatically to adqust the brake so that it imposes the higher and lower retarding torques on the strand being led into the baloon to maintain the pull travel of the pulley 41 in both directions. Thus the maintenance of the balloon under uniform tension at all times is assured.

Figure 5:
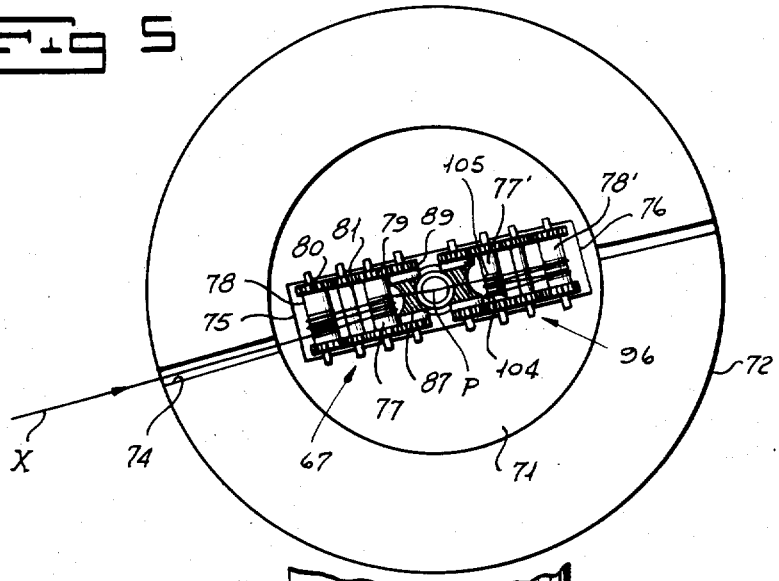
Fig. 5 is a view in horizontal section through the flyer of Fig. 4, the section being taken along the line 5—5 in Fig. 4.
Figure 4:
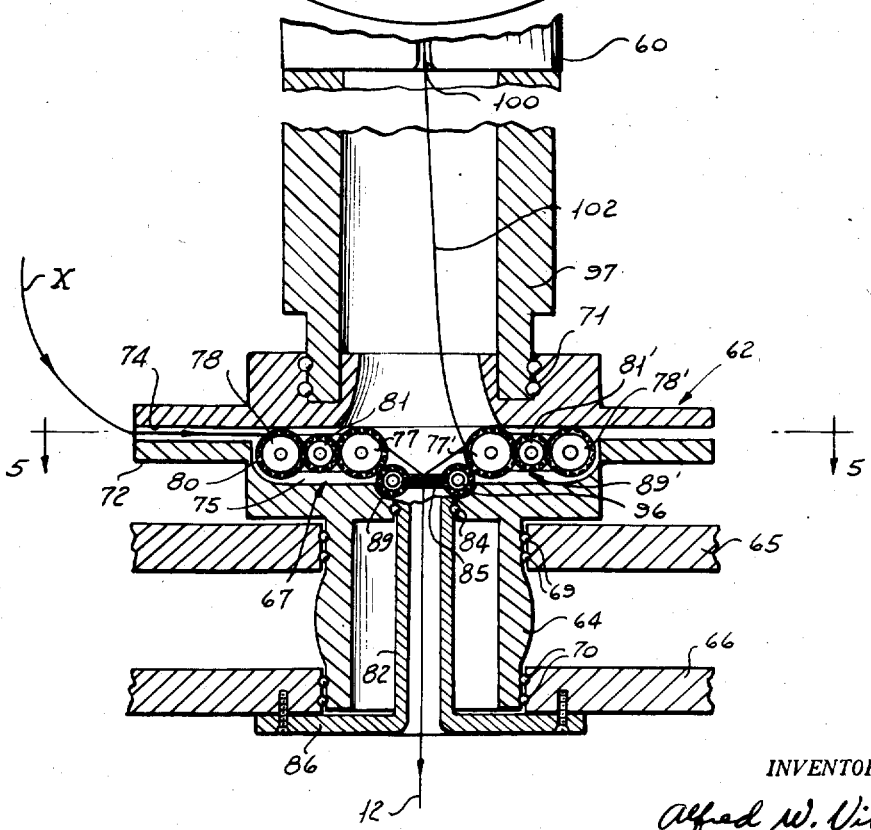
Fig. 4 is an enlarged view generally in axial section of the flyer of the spindle in Fig. 1.

The structure of the loop creating and maintaining means, and of the means 67 and 96 for withdrawing strand 10 from the balloon x and for withdrawing strand 11 from package 59, respectively, will be more readily understood by a consideration of Figs. 4 and 5. The driving and supporting shaft 64 has the flyer 62, in the nature of an enlarged head, thereon. Shaft 64 has its outer surface crowned to engage a driving belt (not shown) and is journalled in the bearings 69 and 70 in the upper and lower frame parts 65 and 66, respectively. The head of the shaft, that is, the flyer 62, has a central thickened hub portion 71 with an outer disc-like portion 72 affixed thereto. A generally radially disposed passage 74 extends through member 72 into the cavity 75 in hub 71, the cavity 75 containing the first feeding means 67. A similar cavity 76 on the diametrically opposite side of the hub contains the second feeding means 96, the parts of which are similar to those of means 67 and are designated by the same reference characters as those employed with means 67 with an added prime.

The strand feeding means 67 is composed of an opposed spaced pair of multi-grooved capstans 77 and 78 journalled in the side walls of the cavity 75, as more clearly indicated in Fig. 5. Such capstans have on the ends thereof the gears 79 and 80 which mesh with the gears on the interposed idler gear member 81, so that the two capstans rotate in the same direction. The strand 10 is led in from the balloon x through the passage 74 and around the capstans 77 and 78 in the manner shown in Fig. 5, progressing from groove to groove of the opposed capstans so that it can finally be led off, in a radial direction, to the plying point P where it meets the strand 11 fed thereto from the second let-off package 59. The capstans 77 and 78 derive their drive from rotation of the flyer 62, at a speed fixedly synchronized therewith, by means of the worm 85 fixedly held in space coaxial of the flyer and the worm gear and pinion member 87 interposed between the worm and the gears in the train 79, 81 and 80 connecting the capstans of the feeding means 67. The worm 85 is positioned within the flyer and is made integral with the vertical tube 82 which is held from rotation by the flange 86 on the bottom thereof, such flange being attached to the frame member 66. A ball bearing 84 is interposed between the bottom of the flyer and the top of the tube 82. The central hourglass worm gear of member 87 meshes with the worm 85, as shown more clearly in Fig. 5. Member 87 has the pinions 89 on the ends thereof meshing with the pinions 79 on capstan 77. It will be apparent that when the pitch and hand of the worm 85 and the worm gear 87, their relative diameters, and the relative diameters of the gears 89 and 79 are properly correlated the capstans 77 and 78 will be rotated in the proper direction and through a desired angle for each rotation of the flyer 62, in other words, that the feeding means 67 will withdraw the material or strand 10 from the balloon x at the proper speed.

The two spaced capstans and the gear intermediate therebetween as well as the hourglass worm gear 87' of the feeding means 96 are the same as those of previously described feeding means 67. *Each of strand-feeding means 67 and 96 feeds its strand at a definite speed with respect to the speed of rotation of the main shaft or flyer of the spindle. Means 67 and 96 may thus each be said to be a strand-metering means, and each includes strand-metering capstans.*

*The strand-metering means 67 and 96 are coupled or connected to rotate in synchronism, and thus meter their respective strands to the plying point in synchronism. The means which couples or connects strand-metering means 67 and 96 is made up of the gears 79 of means 67 and their counterparts in means 96, the hourglass gear means, of which that in means 67 is designated 87, and the coupling worm gear 85 which is mounted coaxial of the main axis or axis of rotation of shaft 64. In the embodiment shown, as above explained, gear 85 also serves the function of driving the strand-metering means 67 and 96 in synchronism with the rotation of shaft 64.* Means 96 withdraws strand 11 from the package 59 at the desired speed, usually the same speed as means 67. Package 59 is held from rotation above the flyer on the axis thereof by the supporting member 60, mounted on the tube 97 which is journalled in the bearing 99 in the top of the flyer 62. Strand 11 is unwound from package 59, and passes upwardly outside the guard ring shown above the package and then downwardly into an axial passage in the central tapered package support which forms an extension of member 60. Member 60 is held from rotation by means of a horizontal spider member 88 attached thereto, as shown in Fig. 1, such spider member having on its periphery the annular magnet 90. Surrounding the magnet 90 and spaced therefrom to provide an annular passage receiving balloon x is a larger annular magnet 91 held on fixed structure of the machine (not shown). Incorporated in the support 60 is the tensioning roller means, generally designated 98, about which the strand 11, in its travel downwardly into member 60, is wrapped a sufficient number of times to provide non-slipping engagement therewith. Roller 98 may be retarded from rotation by means of an adjustably spring pressed brake shoe (not shown) attached thereto, as is conventional in the art.

Upon leaving the tensioning roller 98 the strand 11 runs downwardly through an opening in the bottom of the support 60 providing the guiding eye 100. Strand 11 is brought to the capstan 77' at a side groove 104 thereof, as more clearly shown in Fig. 5. As a result, upon rotation of the flyer 62 there is formed a small balloon 102 between eye 100 and groove 104 of capstan 77'. The central top portion of the flyer 62 is cut away as shown in Fig. 4 so that the balloon 102 need not contact it nor the supporting tube 97. The tension in balloon 102 is preferably made substantially the same as that in balloon x, by suitable adjustment of the means retarding rotation of tension roll 98. Thus in the stranded cord 12 the two plies are in substantially the same physical condition, having been subjected to the same tension before, during, and after plying. Such adjustment of tension means 98 holds the balloon 102 in very tightly, because of the shortness of such balloon 102. Accordingly there is no difficulty in the control of balloon 102 during operation of the system.

The strand 11 at feeding means 96 is run successively from the outer groove 104 in capstan [77] *77'* back and forth between the grooves of such capstan and those in capstan *78'* [78] until it is finally presented to a central groove 105 in capstan 77'. The capstans 77 and 77' are at the same level transverse to the axis of the flyer, as shown in Fig. 4, and present their respective strands to the plying point P along diametrically opposed radii, as shown in Fig. 5. Thus not only do the feeding means 67 and 96, when made identical, insure the delivery of equal lengths of strands 10 and 11 to the plying point P, but they deliver them to such point with identical orientations relative to the axis of the spindle. Thus the resulting plied strand assumes substantially its final set at the plying point, there being no necessity for readjustment of the strands relative to each other upon their downward travel from the spindle.

It will be apparent cord 12 is one wherein the two components themselves have only the initial twist on their own axes which they had before treatment in the mechanism of the invention, the two strands being twisted about each other. Such cord is that which is particularly useful as the reinforcing means in automobile tires and V belts and the like. The lack of the modification of any twist in the singles components of the strands is caused by the fact that each strand undergoes a treatment wherein it is given a first twist in one direction and is then reversely twisted at the point P where the strands are plied together. Such similarity of treatment of the two strands before plying aids in the production of a symmetrical cord.

Thus the loop formed in strand 10, the balloon x being a part of such loop, subjects strand 10 to a first twist (1) in one direction in the balloon and to another twist (2) in the same amount but opposite in direction when strand 10 reaches the axis of the flyer after passing therethrough. The loop formed in strand 10 is therefore a false twisting loop. The same is true of the loop formed in strand 11, such latter loop rotating about the same axis as the loop in strand 10. Strand 11 is given a first twist (1) in balloon 102 in the same direction as twist (1) in strand 10, and is given a second twist (2) of the same amount but in the opposite direction as it comes in to the axis of the flyer after emerging from feeding means 96.

In Fig. 6 there is fragmentarily shown a cord-forming system wherein the enlargement 120 on the head of shaft 64, such enlargement forming a flyer, is provided with idle strand conducting means which forms a part of the rotating loop in strand 10, forms the rotating loop in strand 11, and conducts the strands to the plying point P. The parts of such system which are the same as those shown in Figs. 1–5, inclusive, are designated by the same reference characters. The strand 10 is fed from a source of supply such as a package through a balloon diameter regulating means (neither of these being shown in Fig. 6) such as that shown in Fig. 1. Strand 10 is guided by the upper balloon guiding eye 110 formed on the end of the vertically adjustable arm 114, whereby the height of the balloon x may be varied as desired. A U-shaped support 118 secured to the frame part 112 carries thereon the rotatable vertical worm 116 threadedly engaged with the arm 114. Suitable adjustment of eye 110, and the suitable addition or subtraction of small weights to the weight 42 on the pulley 41, if the means 17, 40, etc. of Fig. 1 for feeding strand 10 into balloon x is employed, will produce a stable balloon x having a predetermined inherent tension therein. The tension producing retarded roll 98 is suitably adjusted so as to impose a tension in the strand 11 as it is presented to the plying point P which is approximately equal to that in the strand 10 as presented to such point. Strand 10 is fed to the point P through a radially positioned passage in the flyer, there being an idle roll 122 at the end of the flyer and a roll 124 adjacent the point P. The strand 11 after passing roll 98 is fed downwardly to the idle roll 126 which engages it on the axis of the flyer. The strand 11 is then fed outwardly around the outer roll 128 and then inwardly over the idle pulley 130, which is positioned symmetrically to the pulley 124 as regards radial distance from point P and its height above point P. The two strands are thus symmetrically presented to the plying point P with symmetrical orientation to each other and to the plied strand. Further, since such strands are subjected to substantially the same tension in approaching such plying point, the resulting plied strand 12 is symmetrical. Such plied strand is taken up by the driven constant speed take-up capstan 132, which may have a structure similar to means 17 in Fig. 1 except that it is driven by a constant speed motor.

The false twist given the strand 10 in the balloon x is the same as that above discussed in connection with Fig. 1. The strand 11 is given a similar false twist by reason of its passage between roller 98 and roller 126, in which first passage it is given a first twist about its axis in one direction, and its passage from roll 130 to the plying point P, in which latter passage it is given a second twist about its axis in the reverse direction. The strand 11 may thus be said to pass through a false twisting loop, since the first twist therein, between means 93 and 126, occurs by reason of the rotation of the run of the strand between rollers 126 and 128 with respect to the roller 98, the second, reverse, twist taking place by reason of the rotation of the run of strand 11 between rollers 128 and 130 about the axis of the plied strand 12. In the embodiment of Figs. 1–5, inclusive, as well as those in Figs. 7–10, inclusive, to be described, both strands may also be said to pass through false twisting loops.

In Fig. 7 there is shown a fragment of a further embodiment of the cord-forming machine of the invention. In such machine, which is the same as that of Fig. 6 except for the substitution of the novel flyer 134, the strands 10 and 11 are plied about each other by being fed through the flyer to the axis thereof, the paths of feeding of the two strands in the flyer coinciding for a part of their runs inwardly to the axis, whereby the strands are combined into parallel relationship before reaching the axis and being plied together. The strand 10 emerges from the balloon x into the flyer under the idle roll 136 on the outer end thereof and over idle roll 142 which presents such strand at the axis of the flyer. The strand 11 travels downwardly along the axis of the flyer, around the upper idle roll 138 on the axis thereof and thence outwardly into a loop formed about the roll 140. The portion of the run of strand 11 from the bottom of the roll 140 to the top of roll 142 coincides with the radially inner portion of the path of travel of strand 10. The combined strands then travel downwardly from the idle roller 142, which rotates with the flyer about the axis of the latter, to the constant speed take-up capstan 132, the plying of the strands about each other to form the plied strand 12 taking place in the plying zone between roller 142 and take-up means 132.

In the embodiment of Fig. 7, as in that of Fig. 6, there is advantageously employed the balloon diameter control means for the strand 10 shown in Fig. 1, and the adjustable tension roll 98 shown in Fig. 6 for the strand 11. The tension in the two strands 10 and 11 approaching the roll 140 may thus be made substantially equal. The two strands 10 and 11 do not begin to twist appreciably about each other until they pass over the roll 142 into the downward run between it and means 132. The tension applied to plied strand 12 by means 132 is divided between the two strands 10 and 11, the two such strands, particularly in that portion in which they travel in combined relationship between the rolls 140 and 142 having an opportunity to readjust their longitudinal positions with respect to each other before they pass into the zone of plying about each other. Thus the device of Fig. 7 is particularly advantageous in that it provides by simple apparatus a cord in which the components are substantially symmetrically plied and in which almost identically equal lengths of the two strands are present in a given length of the plied cord.

In Figs. 8 and 9 there is shown a further embodiment of the cord-forming device of the invention, such device employing a single driven strand feeding means, positively engaging both strands, such strand feeding means being incorporated in the flyer of the device and forwarding the strands to the zone of plying them together. The spindle, shaft, and flyer thereon in Figs. 8 and 9 are substantially the same as those of the embodiment of Figs. 1–5, inclusive, except that the second strand feeding means 96 is omitted therefrom. Consequently the same reference characters for the same parts are employed in Figs. 8 and 9 as those employed with Figs. 1–5, inclusive.

In this embodiment, the strand feeding means 145 has the first capstan 146, the intermediate geared roller 148, and the second grooved capstan 150 connected together as shown. The capstan 146 is so positioned that the roots of its grooves 160, 164, 172, and 168 lie *tangent to* [in] a vertical plane through the axis of the shaft 64. The capstans 146 and 150 are driven, as before, by a member 144 having a central hour-glass worm gear engaging the worm 85 on top of the fixed shaft 82 and pinions on the ends thereof meshing with the pinions 152 on the capstan member 146. Pinions 152 in turn mesh with pinions 154 on member 148 which are meshed with pinions 156 on capstan 150.

The strand 10 enters the feeding means 145, as more clearly shown in Fig. 9, by passing through the substantially radial passage 74 in the flyer into contact with the groove 158 on capstan member 150. Strand 10 then contacts in succession grooves 160, 162, 164, and 166, the first and third of such grooves being on member 146 and the second and fourth grooves being on member 150. Groove 166 is located on the idle roller 167, centrally mounted upon and freely rotatable with respect to member 150. Strand 11 enters feeding means 145 by progressing downwardly partially around the idle guiding roll 147, positioned to maintain the run of cord approaching it substantially axial of shaft 64, and thence laterally into the groove 168 on the capstan member 146. Strand 11 then travels successively into contact with groove 170 on member 150, groove 171 on member 146, then proceeding to the groove 166 on the idle center roller 167 on member 150. The two strands 10 and 11 are thus first gathered into parallel relationship at the groove *166* [160] progressing to the right as shown in Fig. 9 in the run 174 to pass into groove 172 in the idle central pulley 173 mounted on member 146 so as to present plied strand 12 at the axis of the flyer.

As apparent from the above, the feeding means 145 is driven, as are the feeding means 67 and 96 in Fig. 1, at a fixed speed with relation to the flyer 62. Each of strands 10 and 11 has sufficient frictional contact with the capstans 146 and 150 as to be substantially non-slipping with respect thereto. It is to be understood that a larger number of grooves on capstans 146 and 150 may be provided if necessary to provide a larger number of runs of the strands between them to attain such substantially non-slipping feed of the strands. Consequently, an almost identical length of each of the strands is presented at the idle pulley 167. The run 174, between the pulleys 166 and 173, in which the two strands are in parallel, as-yet-untwisted-upon-each-other relation, while being subjected to the tension of the constant tension take-up [156] *156'* allows the two strands to readjust their longitudinal positions with respect to each other, so that when they pass over the pulley 173 into the vertical twisting zone between such pulley and take-up means [156] *156'* substantially equal lengths of the two strands are presented for plying about each other. The constant tension take-up means 156', shown schematically in Fig. 8, may be similar to that shown and described in the patent to Clarkson, No. 2,503,242. The plied strand 12 is subjected to the constant tensional force of the pulley 158' acting on a loop thereof, augmented by the freely hanging adjustable weight 160. The strand passes upwardly from the loop over the idle pulley 162 and downwardly to the take-up bobbin 164.

The apparatus of Figs. 8 and 9 functions to produce a cord which is almost perfectly symmetrical, that is, in which the two strands are plied about each other in the same manner, and one in which substantially identical lengths of the two strands are present in the plied cord. These results follow from the fact that the positively driven feeding means 145 insures the presentation of almost identical lengths of the two strands to the strand combining run 174, and that the two strands have an opportunity to readjust themselves longitudinally of each other so that each sustains its one-half of the total tension on the plied strand before they are fed into the plying zone.

The fifth embodiment of the cord-forming machine of the invention, shown in Fig. 10, employs a geared double capstan arrangement, generally designated 145'. The parts of means 145', that is, the two capstans 146 and 150 and the intermediate gearing member 148, are the same as those shown in Figs. 8 and 9. The feeding means differs from that shown in Figs. 8 and 9 only by the omission of the positive driving means for the feeding means. Consequently, tube 82, worm 85, and the hourglass worm containing member 144 are omitted in the structure of Fig. 10. Further, instead of employing a constant tension take-up means such as means 156, the system of Fig. 10 employs a constant speed take-up capstan 132.

Means 145' is driven, in this embodiment, solely by the tension imposed on the plied strand 12 by means 132, the plied strand in turn, through its components 10 and 11, turning capstans 146 and 150. The components 10 and 11 interchange energy between themselves at feeding means 145' to equalize their rates of travel therepast. As before, the two components of the plied strand have an opportunity in run 174 to readjust themselves longitudinally with respect to each other before they are twisted upon each other. Further, because the strands 10 and 11 have substantially non-slipping engagement with capstans 146 and 150, and because the two capstans are geared together, the delivery of almost identically equal lengths of strands 10 and 11 into the run 174 is insured. *Since the means 145 of Figs. 8 and 9 and the means 145' of Fig. 10 both engage the strands 10 and 11 substantially*

*without slip, they may both properly be termed strand-metering means, and each includes strand-metering capstans.*

Each of the described embodiments of the invention, whether it feeds the strands being plied into initial contact with each other at the axis of the plying shaft or flyer or combines the strands into parallel relationship prior to their being fed to the axis, is characterized by its accurate control of the attitude of the strands, with respect to each other and to the plied strand, before they are plied together. In those embodiments wherein the inner end of the outer loop or balloon is engaged by a positively driven feeding means, the size of the outer loop or balloon has no effect upon the plying action, since the tension in the balloon is isolated from that of the strand issuing from such balloon at the plying point or zone. The embodiments wherein the two strands are positively equalized, whether by one or two driven feeding means synchronized with the flyer or by an idle feeding means which interchanges energy between the strands, as in Fig. 10, are particularly advantageous because of the accuracy of the cord which they produce. With all the systems disclosed, however, the unavoidable minute differences in length of the two strands presented to the plying point or zone are continually uniformly absorbed in the plied product, so that such differences are not accumulated in any portion of either strand leading to the plying point or zone. The operation of plying devices in accordance with the invention is, therefore, particularly free from the need of fine adjustment of the components or of frequent operator attention.

Whereas for purposes of illustration I have shown and described preferred embodiments of the method of and apparatus for plying strands together of my invention, it is to be understood that such embodiments are illustrative only and that the invention is to be defined by the scope of the claims appended hereto.

I claim as new the following:

1. The method of twisting together two strands so as to form a two-ply strand which comprises feeding a first strand from a first source of supply into a first false twisting loop, feeding a second strand from a second source of supply into a second false twisting loop, rotating the second loop in one direction in an orbit about an axis from which the second loop extends generally radially, rotating the first loop in an orbit at the same angular speed and in the same direction as the second loop about the axis of rotation of the second loop, about the orbit of the second loop, and about the second source of supply, and feeding both strands in generally radial runs from substantially diametrically opposite directions at positively equalized rates and in substantially the same plane transverse to the axis of rotation of the loops from their respective loops into initial contact with each other at a point of plying on the axis of rotation of the loops, the rotation of the loops serving to twist the strands about each other.

2. The method of twisting together two strands so as to form a two-ply strand which comprises feeding a first strand from a first source of supply into a first false twisting loop, feeding a second strand from a second source of supply into a second false twisting loop, rotating the second loop in one direction in an orbit about an axis from which the second loop extends generally radially, rotating the first loop in an orbit at the same angular speed and in the same direction as the second loop about the axis of rotation of the second loop, about the orbit of the second loop, and about the second source of supply, and positively feeding both strands at the same speed in generally radial runs from substantially diametrically opposite directions and in substantially the same plane transverse to the axis of rotation of the loops from their respective loops into initial contact with each other at a point of plying on the axis of rotation of the loops, the rotation of the loops serving to twist the strands about each other.

3. The method of twisting together two strands to form a two-ply cord which comprises creating and maintaining a first rotating loop in a first strand leading from a source of supply, creating and maintaining a second rotating loop in a second strand leading from a second source of supply, the axes of the two loops coinciding, the first loop rotating about the second source of supply, and leading the two strands from their loops generally radially inwardly toward the axis of rotation of the loops, bringing the strands into close parallel relationship generally radially of the flyer at a zone outwardly of such axis, positively equalizing the rates of travel of the strands, leading the thus gathered strands at equal rates of travel to the axis, and plying the strands together by rotation of the loops.

4. The method of twisting together two strands to form a two-ply cord which comprises creating and maintaining a first rotating loop in a first strand leading from a first source of supply, creating and maintaining a second rotating loop in a second strand leading from a second source of supply, the axes of the two loops coinciding, the first loop rotating about the second source of supply, and leading the two strands from their loops generally radially inwardly toward the axis of rotation of the loops, bringing the strands into close parallel relationship generally radially of the flyer at a zone outwardly of such axis, positively forwarding the thus combined strands, each at the same rate of travel, to the axis, and plying the strands together by rotation of the loops.

5. The method of twisting together two strands to form a two-ply cord which comprises creating and maintaining a first rotating radially extending loop in a first strand leading from a first let-off package, creating and maintaining a balloon in a second strand leading from a second let-off package, the axes of the loop and balloon coinciding, the balloon rotating about the second let-off package, and leading the two strands from the loop and balloon, respectively, generally radially inwardly toward their axis of rotation, bringing the strands into close parallel relationship generally radially of the flyer at a zone outwardly of such axis, leading the thus gathered strands of the axis, equalizing the rates of travel of the strands toward the axis, and plying the strands together by rotation of the loops.

6. The method of twisting together two strands to form a two-ply cord which comprises creating and maintaining a first rotating loop in a first strand leading from a first let-off package, creating and maintaining a second rotating loop in a second strand leading from a second let-off package, the axes of the two loops coinciding, the first loop rotating about the second let-off package, and leading the two strands from their loops in runs extending generally radially inwardly toward the axis of rotation of the loops, bringing the strands into close parallel relationship generally radially of the flyer at a zone outwardly of such axis, leading the thus gathered strands to the axis, equalizing the rates of travel of the two strands toward the axis by positively feeding at its radial run each of the strands to forward the strands at the same rate to a point of plying on the axes of the loops, and plying the strands together by rotation of the loops.

7. Mechanism for twisting together two strands so as to form a two-ply strand, comprising a source of a first strand and a support carrying a let-off package for a second strand, [a revolving shaft operable to rotate a first loop,] *a shaft rotatable about its axis and operable to rotate with a first loop,* of the first strand, about the package, to rotate a second loop, of the strand of the package, about the axis of the first loop, and also to ply the two strands together, a first means mounted on the shaft for guiding the first strand from the first loop, and a second means mounted on the shaft for guiding the second strand from the package, said last named guiding means forming a loop in the second strand extending [generally radially of] *outwardly of* the axis of rotation of the shaft, said first and second guiding means leading the strands from their respective loops in angularly spaced directions substantially *in planes* radial of the shaft to the junction where they initially contact each other and are plied together.

8. Mechanism for twisting together two strands so as to form a two-ply strand, comprising a source of a first strand and a support carrying a let-off package for a second strand, [a revolving shaft operable to rotate a first loop,] *a shaft rotatable about its axis and operable to rotate with a first loop,* of the first strand, about the package, to rotate a second loop, of the strand of the package, about the axis of the first loop, and also to ply the two strands together, a first means mounted on the shaft for guiding the first strand from the first loop, and second means mounted on the shaft for guiding the second strand from the package, said last named guiding means forming a loop in the second strand extending [generally radially of] *outwardly from* the axis of rotation of the shaft, said first and second guiding means leading the strands from their respective loops in directions generally *in planes* radial of the shaft from generally diametrically opposite directions into initial contact at the junction where they are plied together.

9. Mechanism for twisting together two strands so as to form a two-ply strand, comprising a source of a first strand and a support carrying a let-off package for a second strand, [a revolving shaft operable to rotate a first loop,] *a shaft rotatable about its axis and operable to rotate with a first loop,* of the first strand, about the package, to rotate a second loop, of the strand of the package, about the axis of the first loop, and also to ply the two strands together, a first means mounted on the shaft for positively feeding the first strand from the first loop, and a second means mounted on the shaft for positively feeding the second strand from the package, said last named feeding means forming a loop in the second strand extending [generally radially of] *outwardly from* the axis of rotation of the shaft, said first and second feeding means leading the strands from their respective loops *generally* in angularly spaced [directions] *planes* substantially radial of the shaft to the junction where they are plied together.

10. Mechanism for twisting together two strands so as to form a two-ply strand, comprising a source of a first strand and a support carrying a let-off package for a second strand, a revolving flyer operable to rotate a first loop, of the first strand, about the package, to rotate a second loop, of the strand of the package, about the axis of the first loop, and also to ply the two strands together, a first feeding means driven at a speed synchronized with the speed of rotation of the flyer, said first feeding means being mounted on the flyer and positively feeding the first strand from the first loop, and a second feeding means driven at the same speed as the first feeding means, said second feeding means mounted on the flyer and positively feeding the second strand from the package, said last named feeding means forming a loop in the second strand extending generally radially of the axis of rotation of the flyer, said first and second feeding means leading the strands from their respective loops in angularly spaced directions substantially radial of the flyer to the junction where they are plied together.

11. Mechanism for twisting together two strands so as to form a two-ply strand, comprising a source of a first strand and a support carrying a let-off package for a second strand, a revolving flyer operable to rotate a first loop, of the first strand, about the package, to rotate a second loop, of the strand of the package, about the axis of the first loop, and also to ply the two strands together, a first means mounted on the flyer for positively feeding the first strand from the first loop, and a second means mounted on the flyer for positively feeding the second strand from the package, both said feeding means being driven at the same strand forwarding speed by rotation of the flyer, the second feeding means forming a loop in the second strand extending generally radially of the axis of rotation of the flyer, said first and second feeding means forwarding the strands from their respective loops in directions generally radial of the flyer from generally diametrically opposite directions to the junction where they are plied together.

12. Mechanism for twisting together two strands so as to form a two-ply strand, comprising a source of a first strand and a support carrying a let-off package for a second strand, [a revolving shaft operable to rotate a first loop,] *a shaft rotatable about its axis and operable to rotate with a first loop,* of the first strand, about the package, to rotate a second loop, of the strand of the package, about the axis of the first loop, and also to ply the two strands together, and means mounted on the shaft for guiding the first and second strands from the first and second loops, respectively, said guiding means [leading the strands generally radially of the shaft to the axis thereof] *presenting the strands for travel inwardly to a plying point at least substantially on the axis of the shaft* along paths which coincide in at least that [radial] portion thereof adjacent the axis of the shaft, the rotation of the shaft plying the strands together.

13. Mechanism for twisting together two strands so as to form a two-ply strand, comprising a source of a first strand and a support carrying a let-off package for a second strand, [a revolving flyer operable to rotate a first loop,] *a shaft rotatable about its axis and operable to rotate with a first loop,* of the first strand, about the package, to rotate a second loop, of the strand of the package, about the axis of the first loop, and also to ply the two strands together, and rotatable means mounted on the [flyer] *shaft* for guiding the first and second strands [from] *in* the first and second loops, respectively, said guiding means positively engaging both strands and equalizing the speeds of travel thereof, said guiding means [leading] *presenting* the strands [generally radially of the flyer to the axis thereof,] *for travel inwardly to a plying point at least substantially on the axis of the shaft,* the rotation of the [flyer] *shaft* plying the strands together.

14. Mechanism for twisting together two strands so as to form a two-ply strand, comprising a source of a first strand and a support carrying a let-off package for a second strand, a revolving shaft operable to rotate a first loop, of the first strand, about the package, to rotate a second loop, of the strand of the package, about the axis of the first loop, and also to ply the two strands together, and positively driven feeding means mounted on the shaft for positively feeding the first and second strands from the first and second loops, respectively, said feeding means being driven in synchronism with the rotation of the shaft, said feeding means leading the strands generally radially of the shaft to the axis thereof, the rotation of the shaft plying the strands together, and means for taking-up the plied strand under substantially constant tension.

15. Mechanism for twisting together two strands so as to form a two-ply strand, comprising a source of a first strand and a support carrying a let-off package for a second strand, [a revolving flyer operable to rotate a first loop,] *a shaft rotatable about its axis and operable to rotate with a first loop,* of the first strand, about the package, to rotate a second loop, of the strand of the package, about the axis of the first loop, and also to ply the two strands together, and idle rotatable feeding means mounted on the [flyer] *shaft* for guiding the first and second strands [generally radially inwardly from] *in* the first and second loops, respectively, said feeding means positively engaging the two strands and interchanging energy betwen them to equalize their rates of travel, said feeding means [leading the strands generally radially of the flyer to the axis thereof,] *presenting the strands for travel inwardly to a plying point at least substantially on the axis of the shaft,* the rotation of the [flyer] *shaft* plying the strands together.

16. Mechanism for twisting together two strands so as to form a two-ply strand, comprising a source of a first strand and a support carrying a let-off package for a second strand, a revolving flyer operable to rotate a first loop, of the first strand, about the package, to rotate a second loop, of the strand of the package, about the axis of the first loop, and also to ply the two strands together, and positively driven rotatable feeding means mounted on the flyer for forwarding the first and second strands from the first and second loops, respectively, said feeding means being positively driven in synchronism with the rotation of the flyer, said feeding means positively engaging the first and second strands and leading them generally radially of the flyer to the axis thereof, the rotation of the flyer plying the strands together.

17. The method of twisting together two strands so as to form a two-ply strand which comprises feeding a first strand from a first source of supply into a first twisting loop, feeding a second strand from a second source of supply into a second twisting loop, rotating the second loop about an axis, rotating the first loop about the axis of rotation of the second loop and about the second source of supply, feeding both strands from their respective loops in runs extending generally radially inwardly to a point of plying on the axis of rotation of the loops, and controlling at their radial runs the rate of passage of each of the strands to positively equalize such rates, the rotation of the loops serving to twist the strands about each other.

18. The method of twisting together two strands so as to form a two-ply strand which comprises feeding a first strand from a first source of supply into a first twisting loop, feeding a second strand from a second source of supply into a second twisting loop, rotating the second loop about an axis, rotating the first loop at the same angular speed and in the same direction as the second loop and about the axis of rotation of the second loop and about the second source of supply, feeding both strands from their respective loops in runs extending generally radially inwardly to a point of plying on the axis of rotation of the loops, and positively feeding at its radial run each of the strands to forward the strands at the same rate to the point of plying, the rotation of the loops serving to twist the strands about each other.

19. The method of twisting together two strands so as to form a two-ply strand which comprises feeding a first strand from a first source of supply into a first twisting loop, feeding a second strand from a second source of supply into a second twisting loop, rotating the second loop about an axis, rotating the first loop at the same angular speed and in the same direction as the second loop and about the axis of rotation of the second loop and about the second source of supply, feeding both strands from their respective loops in runs extending generally radially inwardly and in directions substantially diametrically opposite each other into initial contact with each other at a point of plying on the axis of rotation of the loops.

20. Mechanism for twisting together two strands so as to form a two-ply strand, comprising a source of a first strand and a support carrying a let-off package for a second strand, a revolving flyer operable to rotate a first loop, of the first strand, about the package, to rotate a second loop, of the strand of the package, about the axis of the first loop, and also to ply the two strands together, and positively driven rotatable feeding means mounted on the flyer for forwarding the first and second strands from the first and second loops, respectively, said feeding means being positively driven in synchronism with the rotation of the flyer, said feeding means positively engaging the first and second strands and leading them generally radially of the flyer into initial contact at the axis of the flyer, the rotation of the flyer plying the strands together.

21. Mechanism for twisting together two strands so as to form a two-ply strand, comprising a source of a first stand and a support carrying a let-off package for a second strand, a revolving flyer operable to rotate a first loop, of the first strand, about the package, to rotate a second loop, of the strand of the package, about the axis of the first loop, and also to ply the two strands together, and positively driven rotatable feeding means mounted on the flyer for forwarding the first and second strands from the first and second loops, respectively, said feeding means being positively driven in synchronism with the rotation of the flyer, said feeding means positively engaging the first and second strands and leading them generally radially of the flyer, into close parallel relationship generally radially of the flyer at a zone outwardly of the axis of the flyer, and then in such parallel relationship to the axis of the flyer, the rotation of the flyer plying the strands together.

22. Mechanism for twisting together two strands so as to form a two-ply strand, comprising a source of a first strand and a support carrying a let-off package for a second strand, a revolving flyer operable to rotate a first loop, of the first strand, about the package, to rotate a second loop, of the strand of the package, about the axis of the first loop, and also to ply the two strands together, and a first and a second positively driven rotatable feeding means mounted on the flyer for forwarding the first and second strands from the first and second loops, respectively, said feeding means being located on the flyer diametrically opposite each other, both said feeding means being positively driven in synchronism with the rotation of the flyer, said first feeding means positively engaging the first strand and said second feeding means positively engaging the second strand, the feeding means forwarding the strand generally radially of the flyer and along diametrically opposite paths to a point of plying of the strands on the axis of the flyer, the rotation of the flyer plying the strands together.

23. Mechanism for twisting together two strands so as to form a two-ply strand, comprising a source of a first strand and a support carrying a let-off package for a second strand, a revolving flyer operable to rotate a first loop, of the first strand, about the package, to rotate a second loop, of the strand of the package, about the axis of the first loop, and also to ply the two strands together, and positively driven rotatable feeding means mounted on the flyer for forwarding the first and second strands from the first and second loops, respectively, said feeding means being positively driven in synchronism with the rotation of the flyer, said feeding means including means for first separately positively engaging both the first and second strands and means for combining the strands into generally parallel unplied relationship generally radially of the flyer at a location radially displaced from the axis of the flyer and then leading them in such parallel unplied relationship generally radial of the flyer to a plying point on the axis of the flyer, the rotation of the flyer plying the strands together.

24. Mechanism for twisting together two strands so as to form a two-ply strand, comprising a source of a first strand and a support carrying a let-off package for a second strand, a revolving flyer operable to rotate a first loop, of the first strand, about the package, to rotate a second loop, of the strand of the package, about the axis of the first loop, and also to ply the two strands together, a rotatable driven shaft mounting the flyer, positively driven rotatable feeding means mounted on the shaft for forwarding the first and second strands from the first and second loops, respectively, means for positively driving the feeding means in synhcronism with the rotation of the flyer, said feeding means positively engaging the first and second strands and impelling them generally radially of the flyer to the axis thereof, the rotation of the flyer plying the strands together.

*25. A ply action apparatus, comprising a strand metering device having a pair of coupled strand metering capstans, means for generating a balloon of a first strand from a first source, means for guiding a second strand generally along the axis of the balloon, said metering device being rotatable about said balloon axis, said capstans being adapted to each engage a respective one of said strands for synchronous metering thereof to a plying point therebeyond, and means for coupling said capstans.*

*26. Mechanism for twisting together at least two strands so as to form a multi-ply strand, comprising a source of a first strand and a support carrying a let-off package for a second strand, means operable to rotate and guide a first loop, of the first strand, about the package, to rotate and guide a second loop, of the strand of the package, about the axis of the first loop, and also to ply the two strands together, said means including a shaft rotatable about the axis of the loops, a first guide means mounted on the shaft for guiding the first strand from the first loop, and a second means mounted on the shaft for guiding the second strand from the package, said last named guiding means forming the said second loop, said first and second guiding means guiding the strands from their respective loops inwardly to a plying point on the axis of the shaft.*

*27. Mechanism for twisting together at least two strands so as to form a multi-ply strand, comprising a source of a first strand and a support carrying a let-off package for a second strand, means operable to rotate a first loop, of the first strand, about the package, to rotate a second loop, o fthe strand of the package, about the axis of the first loop, and also to ply the two strands together, said means including a rotatable shaft, and rotatable means mounted on the shaft for metering the first and second strands in their travel from the first and second loops, respectively, said metering means positively engaging both strands and equalizing the speeds of travel thereof inwardly to a plying point generally on the axis of the shaft.*

*28. In an apparatus for plying strands at a plying point, and having means to rotate a first strand, from a first source, in the form of a balloon, and means to guide a second strand generally along the axis of the balloon, the improvement which comprises a shaft rotatable about said balloon axis, means on the shaft engaging and metering the first and second strands in their passage toward the plying point, and means coupling the said two metering means to cause them to feed their respective strands in synchronism.*

*29. An apparatus as defined in claim 28, wherein the axis of the shaft lies on the axis of the balloon, and the metering means are located substantially symmetrically on opposite sides of the axis of the shaft.*

*30. An apparatus as defined in claim 29, wherein the metering means form substantially similar loops in the respective strands, said loops lying on opposite sides of the axis of the shaft.*

*31. An apparatus as defined in claim 28, wherein the respective strands are fed inwardly to the plying point in runs extending substantially symmetrically with respect to the axis of the shaft.*

*32. An equalizer capstan organization comprising a supporting member, means mounting the supporting member for rotation about its axis, at least two capstans mounted on a supporting member for rotation therewith about the axis of the supporting member, each capstan being mounted for rotation about an axis separate from said axis of the supporting member, and coupling means adapted to couple said capstans together for synchronous rotation, said coupling means comprising a coupling member mounted coaxially of said supporting member, the coupling member and the supporting member being rotatable relative to each other.*

*33. An equalizer capstan organization as defined in claim 32, wherein the coupling member is a gear, and gear means drivingly connecting the capstans to said gear.*

*34. An equalizer capstan organization as defined in claim 33, wherein the capstans are symmetrically mounted on opposite sides of the axis of the supporting member.*

References Cited in the file of this patent or the original patent

UNITED STATES PATENTS

| | | |
|---|---|---|
| 693,887 | Norman | Feb. 25, 1902 |
| 864,548 | Macfarlane et al. | Aug. 27, 1907 |
| 1,900,037 | Bochmann et al. | Mar. 7, 1933 |
| 2,002,975 | Brooks | May 28, 1935 |
| 2,143,203 | Maxham | Jan. 10, 1939 |
| 2,343,535 | Clarkson | Mar. 7, 1944 |
| 3,400,697 | Lewis | May 21, 1946 |
| 2,442,775 | Nelson | June 8, 1948 |
| 2,503,242 | Clarkson | Apr. 11, 1950 |
| 2,752,749 | De Halleux | July 3, 1956 |
| 2,773,344 | Van Hook | Dec. 11. 1956 |